US009054517B1

(12) United States Patent
Zhu

(10) Patent No.: US 9,054,517 B1
(45) Date of Patent: Jun. 9, 2015

(54) SMART DIAGNOSIS AND PROTECTION CIRCUITS FOR ASIC WIRING FAULT CONDITIONS

(71) Applicant: S3C, Inc., Sunnyvale, CA (US)

(72) Inventor: Zhineng Zhu, Fremont, CA (US)

(73) Assignee: S3C, INC., Sunnyvale, CA (US)

( * ) Notice: Subject to any disclaimer, the term of this patent is extended or adjusted under 35 U.S.C. 154(b) by 9 days.

(21) Appl. No.: 13/829,532

(22) Filed: Mar. 14, 2013

(51) Int. Cl.
*H02H 3/00* (2006.01)
*H02H 9/04* (2006.01)

(52) U.S. Cl.
CPC ....................................... *H02H 9/04* (2013.01)

(58) Field of Classification Search
CPC ........ H02H 3/003; H02H 3/20; H02H 11/002
USPC ............................................ 361/56, 84, 91.1
See application file for complete search history.

(56) References Cited

U.S. PATENT DOCUMENTS 5,212,664 A * 5/1993 Shinohara ..................... 365/229
5,570,043 A * 10/1996 Churchill ........................ 326/81
6,236,236 B1 * 5/2001 Chen ............................... 326/81
6,371,097 B1 * 4/2002 Rossi ............................ 123/691
6,560,082 B1 * 5/2003 Arisawa .......................... 361/84
6,809,915 B2 * 10/2004 Lai et al. ....................... 361/111
7,580,233 B2 * 8/2009 Davis ............................. 361/56
7,688,559 B2 * 3/2010 Sato ................................ 361/56
7,692,905 B2 * 4/2010 Hung .............................. 361/56
8,582,259 B2 * 11/2013 Murakami et al. .............. 361/56
2004/0052022 A1 3/2004 Laraia
2006/0244489 A1 * 11/2006 Sunairi ........................... 326/87
2007/0291432 A1 12/2007 Ueda
2010/0157494 A1 * 6/2010 Kim et al. ....................... 361/56

* cited by examiner

*Primary Examiner* — Thienvu Tran
*Assistant Examiner* — Christopher Clark
(74) *Attorney, Agent, or Firm* — Sawyer Law Group, P.C.

(57) ABSTRACT

An application specific integrated circuit (ASIC) is disclosed. The ASIC comprises an internal circuit coupled between a power line and ground and an output buffer coupled to the internal circuit; wherein the output buffer provides an output signal. The ASIC includes a fault detection circuit coupled between the power line and ground; and a first protection block configured to receive a first control signal from the fault detection circuit. The first switch is coupled to the power line, the output buffer and the internal circuit. The first protection block prevents current from flowing between the power line and ground when a fault condition is detected. The ASIC further includes a second protection block configured to receive a second control signal from the fault detection circuit, wherein the second protection block is coupled to the output signal, the power line and ground. The second protection block prevents current from flowing between the power line and ground or the power line and the output line when a fault condition is detected.

6 Claims, 15 Drawing Sheets

Circuits with protection blocks

Reverse battery protection with series diode

Reverse battery protection using floating well

Reverse battery protection using RBP FET structure

Overvoltage protection using discrete components

Overvoltage protection using on-chip components

Overvoltage and reverse voltage protection

Circuit module with supply, ground and signal line

Circuits with protection blocks

Detail block of protection circuits in Fig. 8

The schematic of block 605A and 605B

Schematic of block 603A

Block diagram of block 603E in Fig. 9

Schematic of block 603E0 in Fig. 12

Schematic of block 603E1 in Fig. 12

Schematic of block 603E2 in Fig. 12

SMART DIAGNOSIS AND PROTECTION CIRCUITS FOR ASIC WIRING FAULT CONDITIONS

FIELD OF THE INVENTION

The present invention is directed generally to protection of integrated circuits and is more particularly directed to detecting fault conditions and providing reliable protection schemes of such circuits.

BACKGROUND OF THE INVENTION

In real applications, especially automotive systems, an integrated circuits (IC) voltage supply, ground or even signal lines could be accidently connected to an unregulated power supply or most negative voltage in the system, resulting in permanent damage to the internal circuits by forward-biasing those ESD or parasitic diodes. Those fault conditions include overvoltage, reverse voltage and under-voltage.

For an overvoltage fault conditions, a conventional solution is to put a high voltage (HV)MOSFET between an external voltage supply and the internal circuits. The gate of this HV MOSFET is either regulated so that the drain of the HV MOSFET outputs a fixed value or is turned off when overvoltage happens. The HV MOSFET typically cannot handle reverse voltage condition because of the parasitic diode between drain and bulk of the HV MOSFET.

For reverse voltage fault conditions, there are three main methods: (1) place a specific diode in series between external supply and internal circuits, this method reduces the voltage headroom for the internal circuits, plus provides power dissipation. (2) use a floating-well device, this method is cost-effective and power-efficient, but it is very susceptible to latch-up and noise and (3) place two MOSFET in series with this bulk connected to source and drain separately, the gate control logic of this tri-state conventionally and also consumes a large current.

Methods focus on the supply line fault connections and use the above identified overvoltage and reverse voltage concepts to protect the internal circuits. In the automotive applications, the signal lines could also have such fault connections. The conventional solutions to this signal line protection is to provide series resistor to limit the maximum current into/out IC. Using this series resistor is not desirable for applications in which the tri-state output is required during fault conditions. The value of this series resistor in some instances has to be larger than 100 Ohm and have limited application.

Hence, conventional systems have the following shortcomings:

Reduced voltage headroom for internal circuits.

Susceptible to latch-up and noise.

Introduce big output impedance on signal lines.

Cannot provide tri-state for certain applications.

Accordingly, what is desired is to provide a system and method that overcomes the above issues. The present invention addresses such a need.

SUMMARY OF THE INVENTION

An application specific integrated circuit (ASIC) is disclosed. The ASIC comprises an internal circuit coupled between a power line and ground and an output buffer coupled to the internal circuit; wherein the output buffer provides an output signal. The ASIC includes a fault detection circuit coupled between the power line and ground; and a first protection block configured to receive a first control signal from the fault detection circuit. The first switch is coupled to the power line, the output buffer and the internal circuit. The first protection block prevents current from flowing between the power line and ground when a fault condition is detected. The ASIC further includes a second protection block configured to receive a second control signal from the fault detection circuit, wherein the second protection block is coupled to the output signal, the power line and ground. The second protection block prevents current from flowing between the power line and ground or the power line and the output line when a fault condition is detected.

Other aspects and advantages of the present invention will become apparent from the following detailed description, taken in conjunction with the accompanying drawings, illustrating by way of example the principles of the invention.

DETAILED DESCRIPTION

The present invention is directed generally to protection of integrated circuits and is more particularly directed to detecting fault conditions and providing reliable protection schemes of such circuits. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

It is a common requirement for electronic circuits to sustain a certain level of reverse voltage or overvoltage on power supply lines and signal lines. This is especially true for ASICs in automotive systems where the main power is not regulated and the electronic modules involve complicated wiring fault. For example, in intelligent power integrated circuits with built-in control circuits for automotive applications, parasitic diodes are formed between a ground terminal and a supply voltage terminal. Therefore, if there is a problem with reverse battery conditions, excessive current would flow through the parasitic diodes between the ground terminal and supply voltage terminal, destroying the power IC if there is no reverse battery protection.

Figure 1:
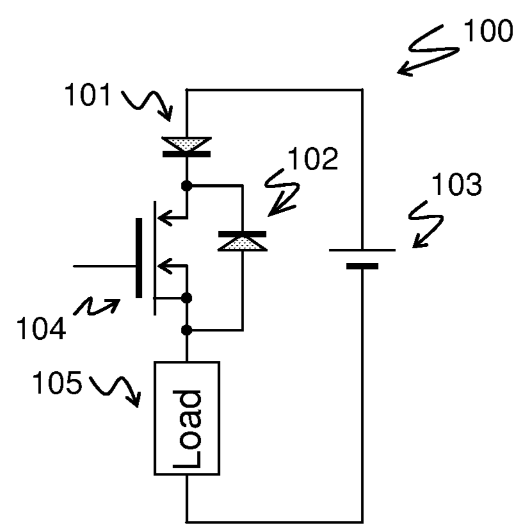
FIG. 1 is a diagram of reverse battery protection with series diode.

Reverse battery protection of the power MOSFET can be easily achieved by adding a diode in series with the power MOSFET and the battery as shown in FIG. 1. However, this method may not be appropriate, because the voltage drop caused by the added diode 101 reduces the voltage available to the load 105 [ ]. Also this extra diode would consume more power.

Figure 2:
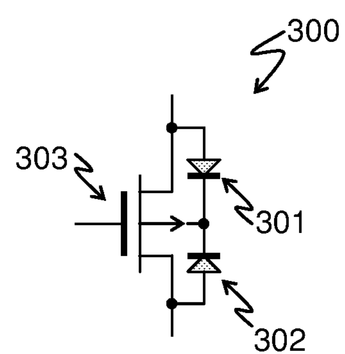
FIG. 2 is a diagram of reverse battery protection using floating well.

Another method for reverse battery protection is using floating well as shown in FIG. 2. The big issue with this method is that the well is not well biased and very susceptible to noise coupling and latch-up.

Figure 3:
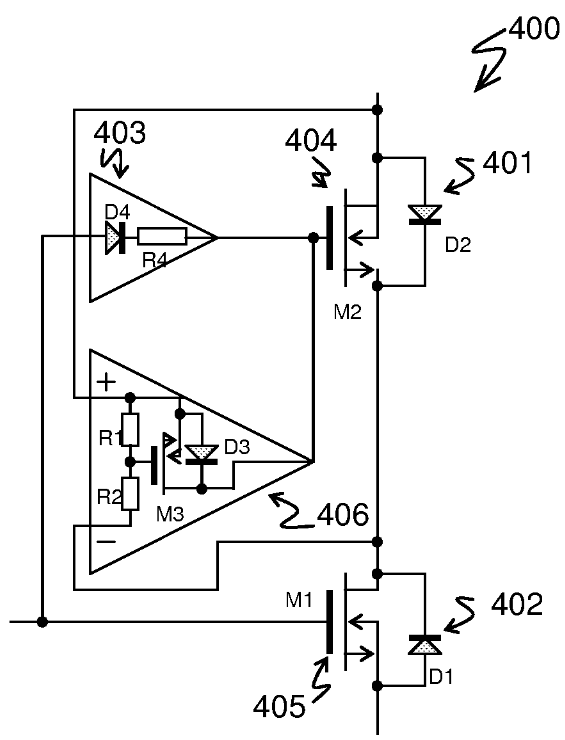
FIG. 3 is a diagram of reverse battery protection using RBP FET structure.

FIG. 3 is a diagram that illustrates a Reverse-Battery-Power MOSFET structure (RBP FET) using two n-channel power MOSFET's with a common drain. For this structure, when battery power is reversed, there is still reverse current as big as 1 mA flowing into the circuit when the reverse voltage is up to −16V, which is very common in automotive application. This 1 mA current prevents such structure to be used in certain applications where the tri-state output is required. The second shortcoming of this structure is that, when VDS>VGS>$V_{th}$, the diode D2 is forward-biased, and consume unnecessary power as the series diode in FIG. 1 does. Also the diode D1, resistors R1 and R2 provide another conduction path when reverse battery connection happens.

The other problem in wiring fault condition is overvoltage. The typical protection scheme for the signal line over voltage is to put a series resistor on those signal lines to limit the current. This scheme obviously introduces unnecessary output resistance on signal line if output is analog signal.

Figure 4:
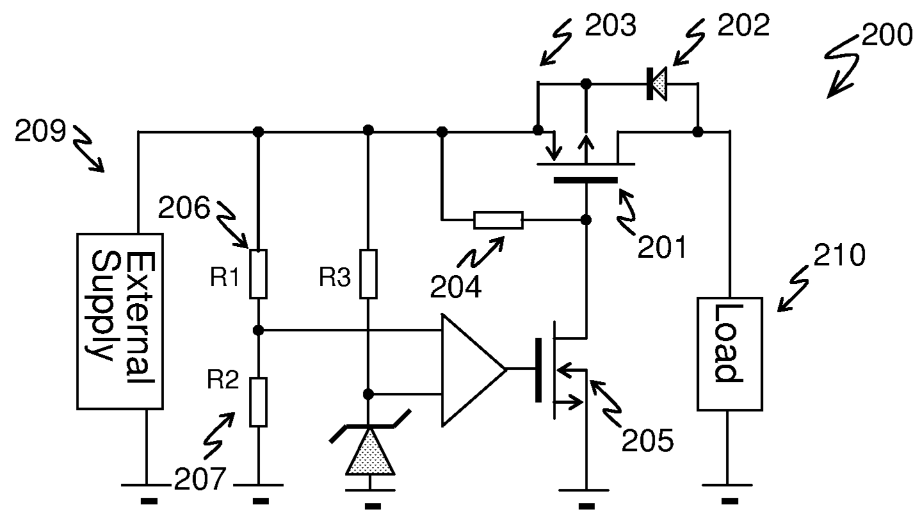
FIG. 4 is a diagram of overvoltage protection using discrete components.

The three types of reverse battery protection schemes in FIG. 1, FIG. 2 and FIG. 3 do not provide overvoltage protection for the internal circuits. For automotive applications, the degree of the fault tolerance for overvoltage can be as high as 16V or even more. Many modern integrated circuits are designed to operate for a typical 5V or less power supply. To address the overvoltage problems on power line, many external discrete components are required, resulted into a bigger integration and higher cost [Application Note 760-Maxim and AN-1533 National]. FIG. 4 shows one example, in which a Zener diode is needed to provide a reference voltage. Zener diode is not provided by most of the CMOS processes [US20070291432].

Figure 5:
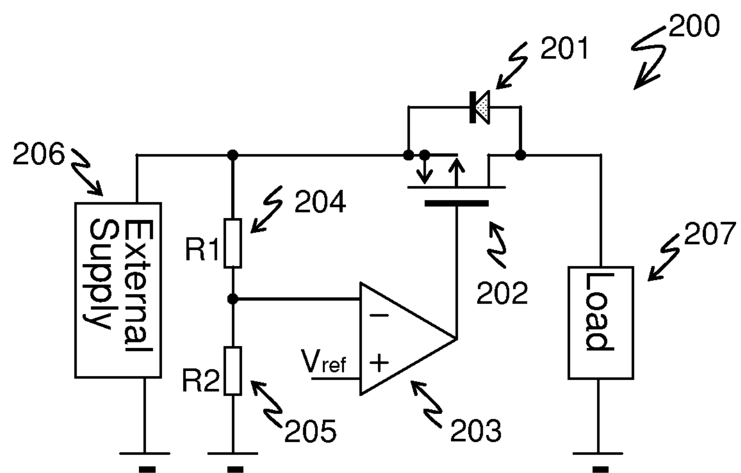
FIG. 5 is a diagram of overvoltage protection using on-chip components.

FIG. 5 shows an overvoltage protection scheme using on-chip reference voltage. This method can provide a higher integration. But in FIG. 4 and FIG. 5, the Power MOSFET has a parasitic diode, which is forward biased when reverse battery connection happens.

Figure 6:
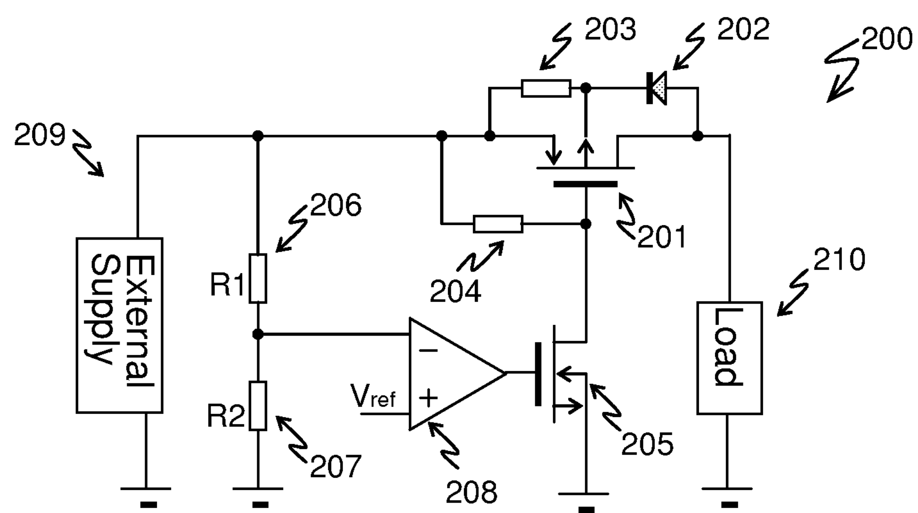
FIG. 6 is a diagram of overvoltage and reverse voltage protection.

[US20040052022] combines the overvoltage and reverse voltage protection into a single control circuit as shown in FIG. 6.

There are two main issues related to the scheme given in FIG. 6, first is that it uses resistor 203 to limit the reverse current. The value of resistor 203 could be kilo-ohm. For reverse supply voltage as high as 16V; the reverse current can be as high as 16 mA. It is not desirable for applications where the high tri-state output is required. The second issue with this scheme is that the well of the MOSFET 201 is not well biased because of resistor 203, which can easily introduce latch-up.

Another limitation about all those mentioned methods is that they are focused on solving the fault conditions of power supply line only. Those schemes are not easy to be applied to signal lines without introducing big resistance and wide enough swing range.

Due to the aforementioned drawbacks, conventional approaches cannot provide a protection scheme covering overvoltage and reverse voltage for both supply line and signal lines.

An ASIC could have wiring fault when connecting to the system. One example is ASIC power and ground lines get reversed and the series ESD diodes are forward biased, which could result in big current running through ASIC. This big current can degrade or damage ASIC if there is no any protection circuit. This invention describes a built-in smart diagnosis and protection circuit for wiring faults. The main protection idea is by limiting or cutting off the current running into or out of the ASIC.

Figure 7:
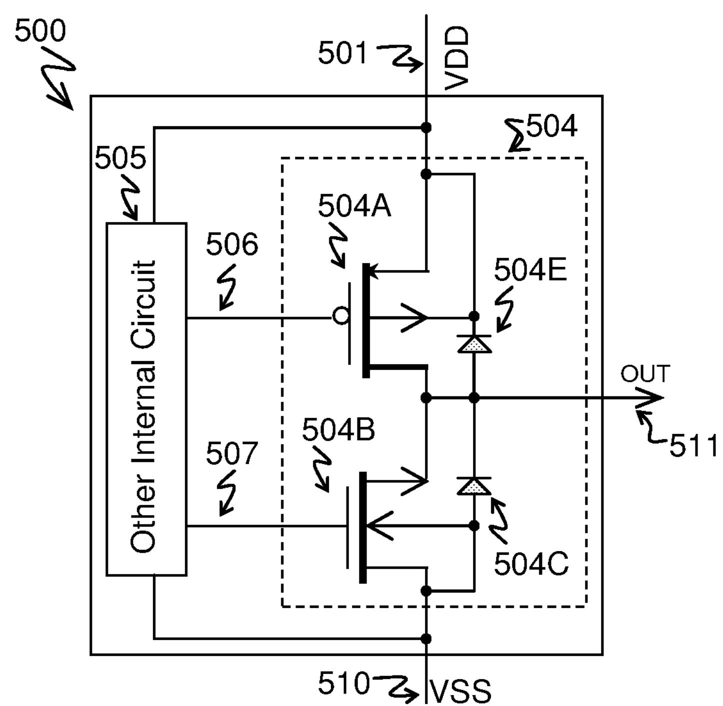
FIG. 7 is a diagram of a circuit module with supply, ground and signal line.

FIG. 7 shows the block diagram of an application specific integrated circuit ASIC 500. 501 is power supply line VDD providing power to circuit 500. 511 is the output signal OUT. Different circuits could have different number of output signals. Here just one output signal is shown without losing generality. Wire 510 is ground line VSS. Block 504 is an output buffer, which could be digital or analog, included in almost all the IC circuits. In block 504, there are 4 components: the first one is PMOS 504A, its source and bulk are both connected to the signal 501 VDD, while its drain is connected to the drain of NMOS 504B as the output signal OUT 511. The source and bulk of NMOS 504B are both connected to the ground line 510 VSS. The diode of 504E is the parasitic diode between the drain and bulk of PMOS 504A. The diode of 504C is the parasitic diode between the substrate and drain of NMOS 504B. Block 505 is a block representing all the remaining circuits in an ASIC. Its output signal 506 and 507 drive the gates of 504A and 504B respectively. It takes power from power line 501 VDD and 510 VSS. It has two output signals: signal 506 and signal 507. Signal 506 drives the gate of PMOS 504A; while signal 507 drives the gate of NMOS 504B.

For normal operation, the voltage values of both 501 VDD and 510 VSS are within the specified value and the signal 511 OUT is between VDD and VSS. One typical example in automotive application is that VDD is 5V, VSS is 0V and OUT is connected to VDD through an external pull-up resistor.

In the real application, when the module shown in FIG. 7 is connected to the remaining system, various fault connections could happen accidently. Table I shows 3 typical cases for an application where more than one power supply voltages exist: the regulated supply voltage $V_s$ and the unregulated supply voltage $V_{BATT}$, where the unregulated $V_{BATT}$ could be much higher than $V_s$.

TABLE I

| No | VDD | VSS | OUT | Note |
|---|---|---|---|---|
| 1 | $V_{BATT}$ | GND | R -> Vs | VDD is under over-voltage condition |
| 2 | GND | Vs | R -> Vs | VDD and VSS are reversed |
| 3 | Vs | GND | $V_{BATT}$ | OUT pin is under over-voltage condition |

Note:
$V_{BATT}$ is un-regulated supply > Vs, while Vs is regulated supply.

Note: $V_{BATT}$ is un-regulated supply >Vs, while Vs is regulated supply.

For case 1, pin VSS is connected to the ground signal GND and pin OUT is connected to VDD through pull-up resistor. But signal VDD is wrongly connected to $V_{BATT}$, instead of $V_s$, which make pin VDD under undesirable overvoltage condition. This overvoltage will expose internal low voltage devices to the high $V_{BATT}$ voltage and could get damaged.

For case 2, pin OUT is connected to Vs through pull-up resistor. But pin VDD and pin VSS get reversed and forward bias all those internal parasitic diodes between VDD and VSS; among them are 504C and 504E as shown in FIG. 7. The devices could be damaged with those diodes forward biased.

For case 3, pin VDD and pin VSS are connected to the desired voltages, while output pin OUT is connected to unregulated voltage $V_{BATT}$, results in big current in diode 504E as shown in FIG. 7, which could damage PMOS 504A and NMOS 504B.

The above table just list 3 typical cases of the wrong connections. The fault conditions in the real applications are far more than those listed. When any wrong connections happen, there could be a very big current running into or out of ASIC through those three terminals. This big current could damage the ASIC, and therefore needs protection circuits.

Design Requirements for Protection Circuits

The main requirements for the fault condition protection circuits are:

1. Whenever there are any wrong connections happening to OUT pin, devices connected to OUT pin should take as little current and voltage as possible. In some applications, the tri-state is required for this OUT pin when wrong connections happen.

2. If VDD and VSS are reversed, the current between VDD and VSS should be limited or even cut off, in that way there is no big reverse current running from VSS to VDD to damage ASIC.

3. The protection circuits shouldn't affect the functionality of those protected circuits during the normal operation mode.

Figure 8:
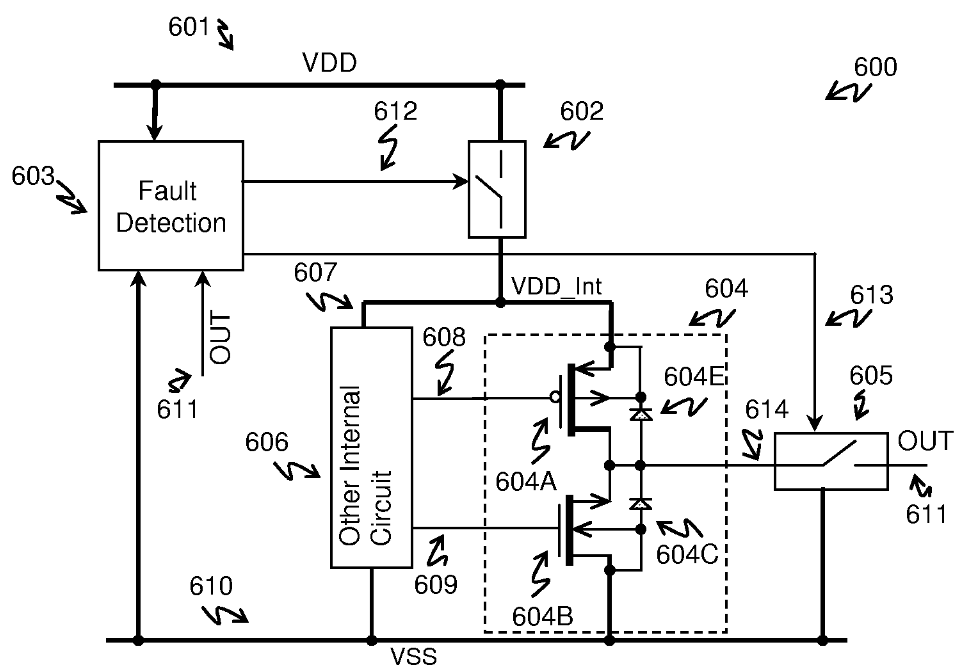
FIG. 8 shows circuits with protection blocks.

To meet the above design requirements, the block diagram with protection sub-blocks is proposed as shown in FIG. 8 based on N-type well process.

In FIG. 8, the block 603 is 'Fault Detection' circuit. It takes power supply signal VDD 601, the ground signal VSS 610 and the OUT signal 611 as the inputs, and generates two control signals: signal 612 and signal 613 based on the relative voltage relationship among 601 VDD, 610 VSS and 611 OUT pin. Signal 612 is the input to the block 602 to turn on/off block 602. Block 602 is the VDD fault protection circuit. It takes signal 601 VDD as another input and generates signal 607, which is named as VDD_Int. VDD_Int is an internal power supply signal providing power for output driver 604 and block 606.

Block 606 represents all those circuits in ASIC except the output driver 604. The block 606 is connected to the internal supply signal 607 and ground signal 610 VSS. It generates signals 608 and 609. Output driver 604 comprises a PMOS 604A, NMOS 604B, parasitic diodes 604C and 604E. The source and bulk of 604A is connected to the internal power supply 607 and the cathode of diode 604E. The gate of 604A is connected to 608, while its drain is connected to the drain of NMOS 604B and anode of 604E. The source and bulk of NMOS 604B are connected to 610 VSS line and anode of diode 6040.

The gate of NMOS 604B is connected to 609, while its drain is connected to cathode of 604C and signal 614. The diode of 604C is the parasitic diode of NMOS 604B between substrate and drain. The diode of 604E is the parasitic diode of PMOS 604E between drain and bulk. The drain of NMOS 604B is output driver 604's output 614, and is connected to the block 605. Block 605 is output protection circuit. It takes another input 613 generated by block 603. Signal 613 is to turn off block 605 when there is a fault condition happening to pin OUT.

From FIG. 8, it is observed that, for fault condition protection, there are three extra blocks added: VDD fault protection block 602, 'Fault Detection' block 603 and output protection block 605. VDD fault protection block is to cut off current path between VDD 601 and VSS 610 if VDD 601 is overvoltage or VDD 601 and VSS 610 are reversed. Output protection block 605 is to cut off current path between VDD 601 or VSS 610 and VOUT 611 if pin OUT voltage is bigger than VDD 601 or less than VSS 610. The block 603 'Fault Detection' block is to check relative voltage level among pins VDD 601, VSS 610 and OUT 611 and generates corresponding control signals 612 and 613.

The following table gives 3 typical fault cases with the states of block 602 and 605 based on FIG. 8 and the design requirements:

TABLE II

| No | VDD | VSS | OUT | 602 | 605 | Note |
|---|---|---|---|---|---|---|
| 1 | $V_{BATT}$ | GND | R -> Vs | off | off | VDD is under over-voltage condition |
| 2 | GND | Vs | R -> Vs | off | off | VDD and VSS are reversed |
| 3 | Vs | GND | $V_{BATT}$ | on or off | off | OUT pin is under over-voltage condition |

Note:
$V_{BATT}$ is un-regulated supply > Vs, while Vs is regulated supply.

Figure 9:
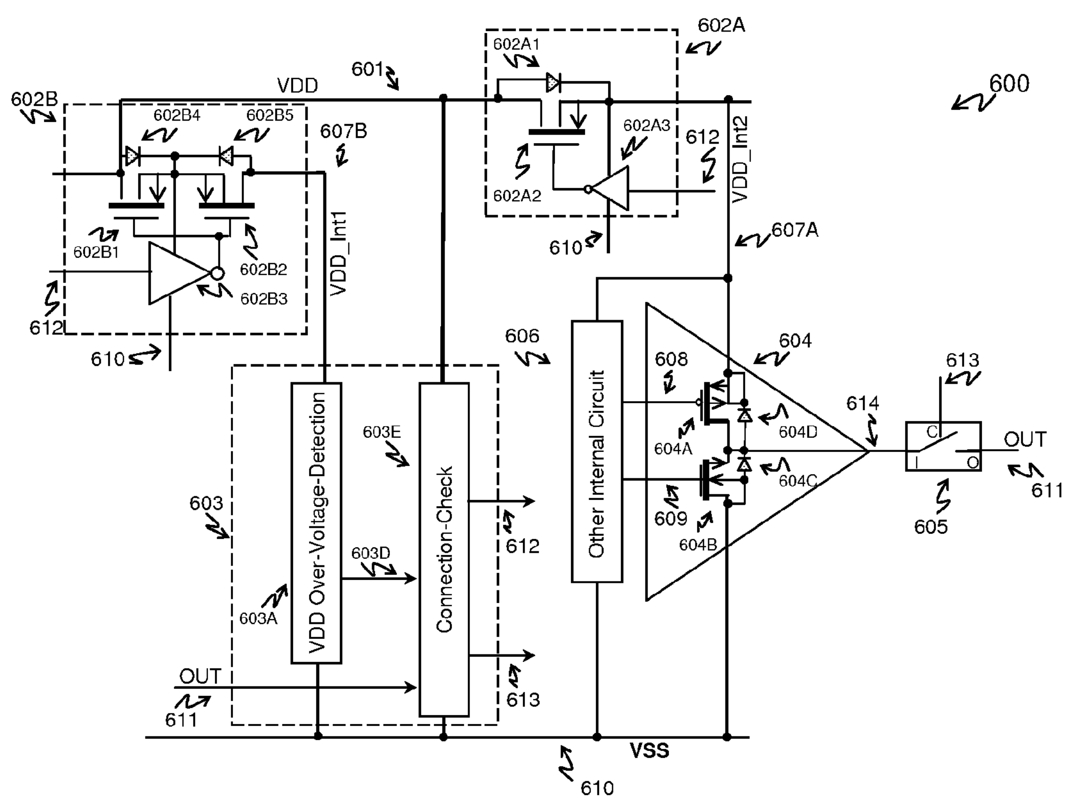
FIG. 9 shows a detail block of protection circuits in FIG. 8.

FIG. 9 shows the details of FIG. 8. Blocks 602A and 602B are VDD fault protection circuits corresponded to the block 602 in FIG. 8. Signal 607A and 607B are internal power lines corresponding to signal 607 in FIG. 8.

Block 602A rakes VDD signal 601, control signal 612 and VSS signal 610 as the inputs and generates internal power supply signal 607A. VDD signal 601 is connected to the drain of PMOS 602A2. The source and bulk of PMOS 602A2 are connected to signal 607A and cathode of diode 602A1. The gate of PMOS 602A2 is driven by an inverter 602A3, the supply line for inverter 602A3 is connected to the signal 607A, while the ground line for inverter 602A3 is connected to VSS signal 610. The input of inverter 602A3 is connected to signal 612. Device 602A1 is the parasitic diode between the drain and bulk of PMOS 602A2.

Block 602B takes VDD signal 601; control signal 612 and VSS signal 610 as the inputs and generates another internal power supply signal 607B. VDD signal 601 is connected to the drain of PMOS 602B1. The source and bulk of PMOS 602B1 are connected to the source and bulk of PMOS 602B2. The gates of both PMOS 602B1 and 602B2 are driven by an inverter 602B3. The supply line of inverter 602B3 is connected to source of 602B2. The ground line of inverter 602B3 is connected to VSS signal 610. The input of inverter 602B3 is connected to the control signal 612. The device 602B4 is the parasitic diode between the drain and bulk of PMOS 602B1. The other device 602B5 is the parasitic diode between the drain and bulk of PMOS 602B2.

Block 603 is 'Fault Detection' block correspond to block 603 in FIG. 8. It takes VDD signal 601, OUT signal 611, VSS signal 610 and signal 607B as inputs, and generates two control signals 612 and 613. Block 603 comprises two sub-blocks: VDD Over-Voltage Detection 603A, Connection-Check 603E.

Block 603A is to detect whether there is any over voltage happening on VDD signal 601. If there is over-voltage on signal 607B, it will set signal 603D high to indicate there is over-voltage on signal 607B and VDD signal 601. The supply line of block 603A is connected to signal 607B and its ground line is connected to VSS signal 610.

Block 603E takes VDD signal 601, VSS signal 610, OUT signal 611 and signal 603D as inputs and generates control signals 612 and 613.

Block 605 is basically a switch to protect internal signals 614 from any possible out-of-range voltages that occur on OUT signal 611. It has 3 terminals, one terminal is connected to control signal 613. The remaining two terminals, one is connected to internal signal 614, and the other is connected to OUT signal 611.

Figure 10:
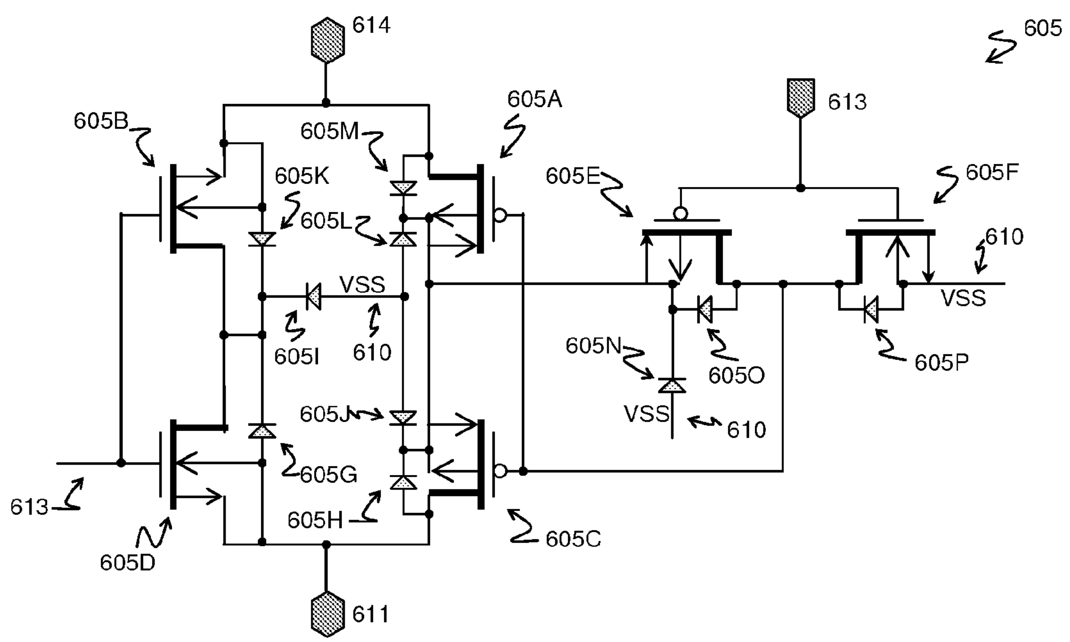
FIG. 10 shows the schematic of block 605A and 605B.

The schematic of block 605 is shown in FIG. 10. There are three terminals in FIG. 10, one is connected to control signal 613, the second terminal is connected to signal 611, and the third terminal is connected to signal 614 as shown in FIG. 9. Device 605A is a PMOS MOFSET and 605B is a NMOS MOSFET. The drain of PMOS 605A is connected to the signal 614 and the source and bulk of NMOS 605B. The source and bulk of PMOS 605A are connected to the source and bulk of PMOS 605C. The drain of PMOS 605C is connected to the signal 611. The drain of NMOS 605B is connected to the drain of NMOS 605D. The source and bulk of 605D are connected to the signal 611.

The gates of both NMOS 605B and 605D are driven by the signal 613. PMOS 605E and NMOS 605F comprises an inverter with gates driven by the signal 613. The source and bulk of PMOS 605E are connected to the source of PMOS 605A and 605C. The drain of PMOS 605E is connected to the drain of NMOS 605F and the gates of PMOS 605A and NMOS 605C. The source and bulk of 605F are connected to VSS signal 610. There are parasitic diodes in FIG. 10. Those diodes are important for voltage fault protection. The diodes 605K and 605G are parasitic ones between bulk and drain of NMOS 605B and 605D respectively. The diode 605I is the parasitic one between substrate and bulk of NMOS 605B and 605D. The diodes between drain and bulk of PMOS 605C and 605A are 605H and 605M respectively. The diodes 605J and 605L are parasitic ones between substrate and bulk of PMOS 605C and 605A respectively. The diode 605N is the parasitic one between substrate and bulk of PMOS 605E. The diode 605O is the parasitic one between bulk and drain of PMOS 605E. The diode 605P is the parasitic one between drain and bulk of NMOS 605F.

Block 604 in FIG. 9 is an output buffer circuit. PMOS 604A and NMOS 604B are two driving MOSFETs. The source and bulk of PMOS 604A are connected to the signal 607A, while its drain is connected to the signal 614 and the drain of NMOS 604B. The source and bulk of NMOS 604B is connected to VSS signal 610. Diode 604D is parasitic diode between drain and bulk of PMOS 604A. Diode 604C is parasitic diode between bulk and drain of NMOS 604B. The gate of PMOS 604A is driven by signal 608 generated by block 606. The gate of NMOS 604B is driven by signal 609 generated by block 606. Block 606 in FIG. 9 corresponds to block 606 in FIG. 8. The supply line of block 606 is connected to signal line 607A, and its ground line is connected to VSS signal 610.

TABLE III

| No | VDD | VSS | OUT | 603D | 612 | 613 | 602B1/602B2 | 602A2 | 605 |
|---|---|---|---|---|---|---|---|---|---|
| 1 | $V_{BATT}$ | GND | normal | $V_{BATT}$ | $V_{BATT}$ | 0 | On | On | Off |
| 2 | GND | Vs | normal | Vs | 0 | 0 | Off | Off | Off |
| 3 | Vs | GND | $V_{BATT}$ | $V_{BATT}$ | 0 | 0 | Off | Off | Off |

Figure 11:
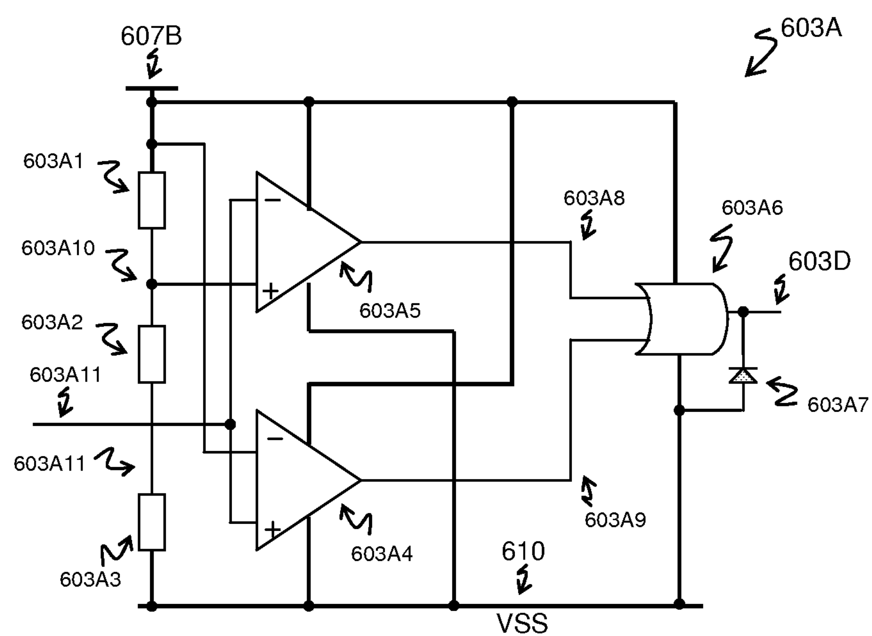
FIG. 11 shows the schematic of block 603A.

FIG. 11 shows the schematic of block 603A in FIG. 9. Signal 607B, 603D and VSS signal 610 correspond to the signals with the same names in FIG. 9. Resistors 603A1, 603A2 and 603A3 comprises a resistor divider. One terminal of resistor 603A1 is connected to signal 607B, and its other terminal is connected to signal 603A10. For resistor 603A2, one terminal is connected to signal 603A10, and the other terminal is connected to signal 603A12. One terminal of resistor 603A3 is connected to 603A12, and the other terminal is connected to VSS signal 610. 603A5 is a comparator, its positive input is connected to the signal 603A12, and its negative input is connected to signal 603A11, which is a reference signal.

The output signal of comparator 603A5 is signal 603A8. 603A4 is another comparator which output signal 603A9. The positive input of 603A4 is connected to signal 603A11 with its negative input to signal 603A10. Both comparators 603A4 and 603A5 take signal 607B as power line and VSS signal 610 as ground line. When signal 607B is bigger than certain value, comparator 603A5 will set signal 603A8 to high level.

When signal 607B is smaller than certain value, comparator 603A4 will set signal 603A9 to high. Component 603A6 is an OR gate, it takes signal 603A8 and 603A9 as inputs, and outputs signal 603D. OR gate 603A6 takes 607B as supply line and VSS signal 610 as ground line. The diode 603A7 is parasitic diode within gate 603A6. Its cathode is connected to signal 603D and anode is connected to VSS signal 610. Any signal between 603A8 and 603A9 is high, signal 603D will be high too, and indicating signal 607B is out of range. If VSS and VDD are reversed, signal 603D will be pulled-up to VSS by the diode 603A7, also indicating a fault condition.

Figure 12:
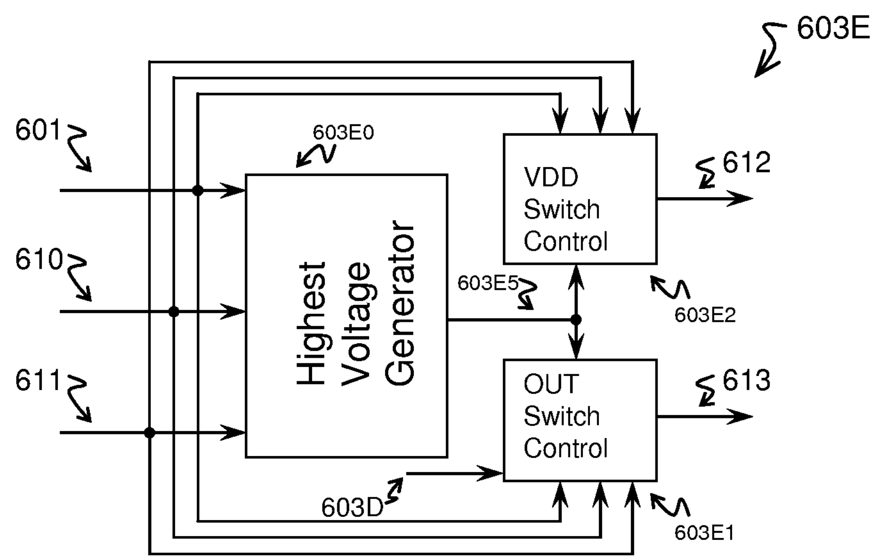
FIG. 12 shows the block diagram of block 603E in FIG. 9.

FIG. 12 shows the block diagram of block 603E in FIG. 9. This block is to generate two control signals 612 and 613 as shown in FIG. 9. The signals 601, 610 and 611 are the signals with the same names in FIG. 9. Block 603E0 takes signals 601, 610 and 611 as the inputs and find out which of those three signals has the highest voltage value and output it as signal 603E5. Block 603E1 takes the signals 601, 610, 611 and 603E5 plus signal 603D, and generates control signal 613. The signal 603D is shown in FIG. 9 and FIG. 11 showing whether signal VDD 601 is out of range. Block 603E2 also takes the signals 601, 610, 611 and 603E5 as the inputs and output control signal 612.

Figure 13:
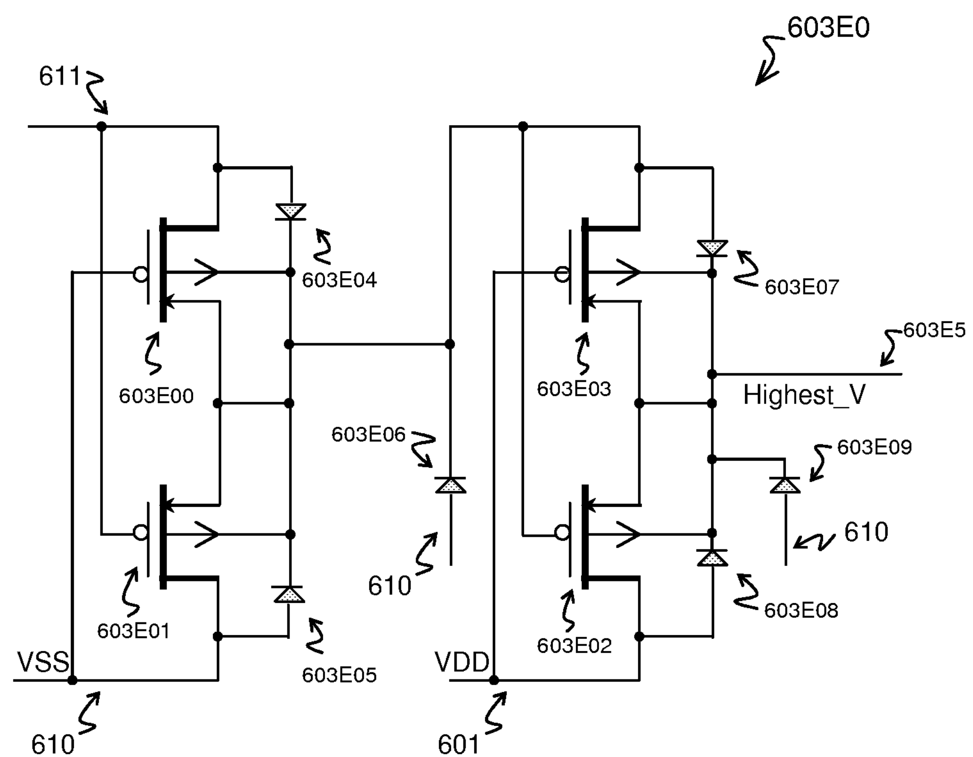
FIG. 13 shows the schematic of block 603E0 in FIG. 12.

FIG. 13 shows the schematic of block 603E0 in FIG. 12, the signal 601, 610 and 611 are the same as those in FIG. 9 and FIG. 12. Devices 603E00, 603E01, 603E02 and 603E03 are all PMOS. The source and bulk of PMOS 603E00 and those of PMOS 603E01 are connected together. The drain of PMOS 603E00 is connected to the signal 611 with its gate to the signal 610. The drain of PMOS 603E01 is connected to the signal 610 with its gate to the signal 611. The sources and bulks of PMOS 603E02 and those of PMOS 603E03 are connected together.

The drain of PMOS 603E03 is connected to the drain of PMOS 603E00, while its gate is connected to the signal 601. The drain of PMOS 603E02 is connected to the signal 601 and its gate is connected to the drain of PMOS 603E03. The device 603E04 is parasitic diode between the drain and bulk of PMOS 603E00. The devices 603E05 is the parasitic diode between drain and bulk of PMOS 603E01.

The device 603E06 is the parasitic device between the substrate and the bulk of PMOS 603E00 and 603E01. The device 603E07 and 603E08 are parasitic diodes between the drains and bulks of PMOS 603E03 and 603E02 respectively. The device 603E09 is the parasitic diode between the substrate and bulk of PMOS 603E02 and 603E03 respectively. This block outputs the highest voltage among signals 601, 610 and 611.

For example, if voltage 601 is 16V, voltage 610 equals 5V and voltage 611 is 0V. For this case, PMOS 603E00 is off and 603E01 is on, and the voltage at the drain of 603E01 is equal to 5V as voltage 610. Since voltage of 610 is less than that of 601, PMOS 603E03 is off and PMOS 603E02 is on. The final output of this block, 603E05, is equal to 16V, which gives the highest voltage among signals 610, 611 and 601.

Figure 14:
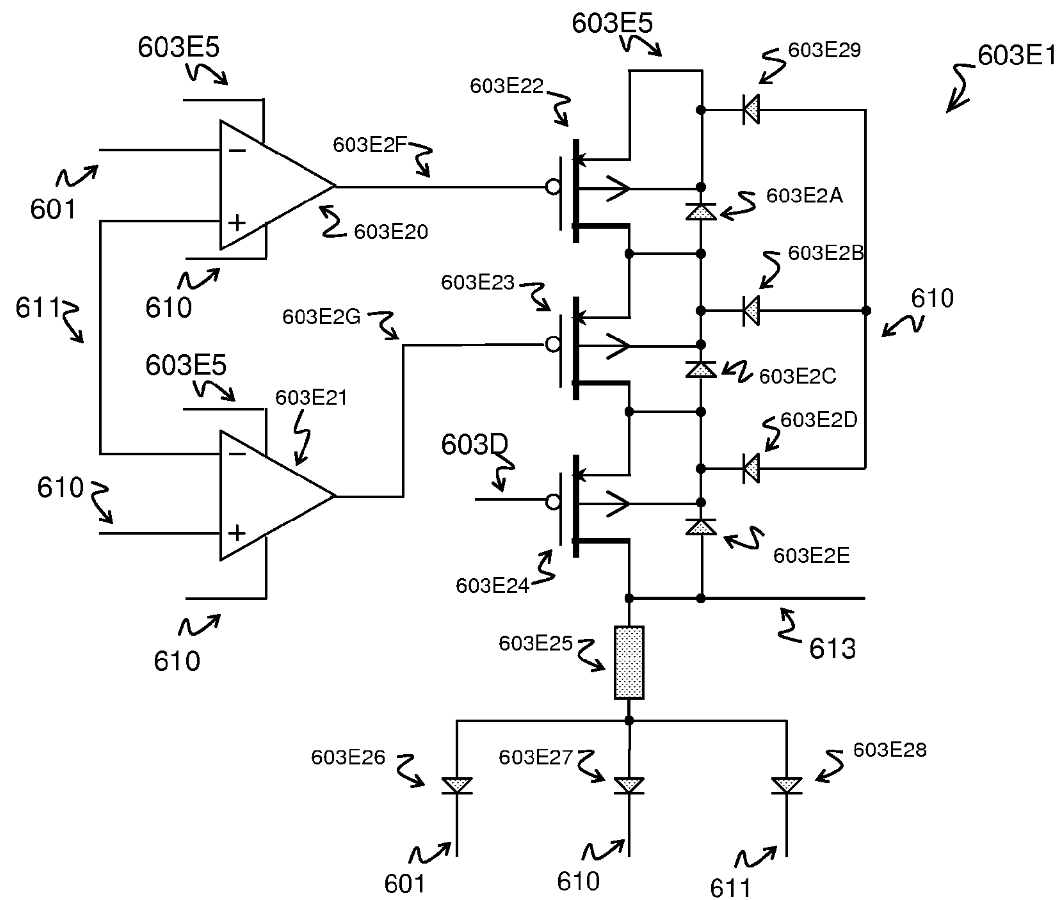
FIG. 14 shows the schematic of block 603E1 in FIG. 12.

FIG. 14 shows the schematic of block 603E1 in FIG. 12, the signal 601, 610, 611, 613, 603D and 603E5 are the same as those in FIG. 9 and FIG. 12. The block 603E20 and 603E21 are comparators; 603E20 rakes the signal 601 as the negative input and 611 as the positive input and its output signal 603EF drives the gate of PMOS 603E22. The comparator 603E21 takes the signal 611 as the negative input and 610 as the positive input with its output signal 603E2G driving PMOS 603E23. Both comparators rake the signal 603E5 in FIG. 12 as the power supply line and 610 as the ground line.

The source and bulk of PMOS 603E22 are connected to the signal 603E5, while its drain is connected to the source and bulk of PMOS 603E23. The source and bulk of PMOS 603E24 is connected to the drain of PMOS 603E23 with its gate connected to the signal 603D. The drain of PMOS 603E24 is connected to one terminal of resistor 603E25.

The other terminal of resistor 603E25 is connected to signal 603E2H, which is the anodes of diodes 603E26, 603E27 and 603E28. The cathode of diode 603E26 is connected to the signal 601. The cathode of diode 603E27 is connected to the signal 610. The cathode of diode 603E28 is connected to the signal 611.

To make this whole protection circuit function as expected, there shouldn't be any junction diode formed between any terminals of diodes 603E26, 603E27 and 603E28 with substrate. Otherwise there will be a current path from ground signal 610 to one terminal of those diodes if ground signal 610's potential is accidentally pulled higher than either VDD signal 601 or OUT signal 611. In CMOS process, the type of diode that can meet this requirement is polysilicon diode.

To make a state-of-art polysilicon diode, a STI layer is located above the silicon substrate. The polysilicon layer is deposited on this STI layer. Then p-type and n-type highly doped regions and formed adjacently on this polysilicon layer. Because polysilicon diode is implemented on the STI layer, it is isolated from the silicon substrate. The devices 603E2A, 603E2C and 603E2E are the parasitic diode between drain and bulk of PMOS 603E22, 603E23 and 603E24 respectively. The devices 603E29, 603E2B and 603E2D are the parasitic diodes between substrate and bulk of PMOS 603E22, 603E23 and 603E24 respectively.

If there is any fault condition happens, at least one signal among 603E2F, 603E2G and 603D is high, which makes one PMOS among 603E22, 603E23 and 603E24 to be turned off, and there is no current running through resistor 603E25. Therefore the voltage at node 613 is equal to the node 603E2H. Since there is no current running through resistor 603E25, the voltage at node 603E2H is determined by the lowest voltage among 601, 610, and 611.

For example, assuming voltages at 601, 610 and 611 are 0V, 5V and 16V respectively, the diodes 603E27 and 603E28 are reverse biased and there is no current through them except leakage current. This leakage current will make diode 603E26 barely forward biased and the voltage at 603E2H and 613 are almost equal to voltage at 601 as 0V because of the very small leakage current. That means the function of this block is to output the lowest voltage among signals 601, 610 and 611 when there is a fault condition happens.

If there is no fault conditions, all three signals, 603E2F, 603E2G and 603D are low, which makes all PMOS 603E22, 603E23 and 603E24 on, and there is current conducting through the resistor 603E25 and one of diode among 603E26, 603E27 and 603E28. This current generates a voltage drop across resistor 603E25, the high resistor value of resistor 603E25 can make the voltage of 613 as logic high, indicating a normal case.

Figure 15:
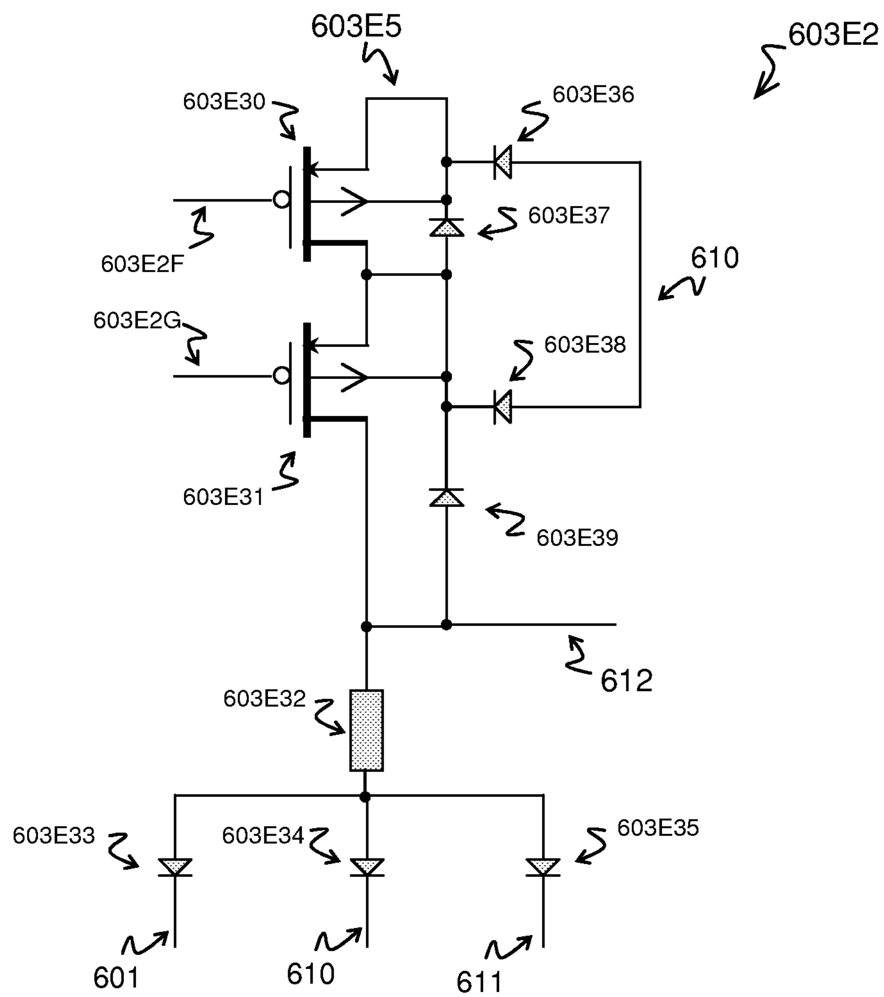
FIG. 15 shows the schematic of block 603E2 in FIG. 12.

FIG. 15 shows the schematic of block 603E2 in FIG. 12, the signal 601, 610, 611, 612, and 603E5 are the same as those in FIG. 9 and FIG. 12. The signal 603E2F and 603E2G are the same as those in FIG. 14. The source and bulk of PMOS 603E30 are both connected to the signal 603E5. The gate of PMOS 603E30 is connected to the signal 603E2F, which is the output signal of the comparator 603E20 in FIG. 14. The drain of PMOS 603E30 is connected to the source and bulk of PMOS 603E31. The gate of PMOS 603E31 is connected to the signal 603E2G, which is the output signal of comparator 603E21 in FIG. 14.

The drain of PMOS 603E31 is connected to one terminal of resistor 603E32. The other terminal of resistor 603E32 is connected to the anodes of diodes 603E33, 603E34 and 603E35. The cathode of diode 603E33 is connected to the signal 601. The cathode of diode 603E34 is connected to the signal 610. The cathode of diode 603E35 is connected to the signal 611. The diode 603E33, 603E34 and 603E35 should also have no junction diode with substrate. These diodes can be polysilicon diodes as those in FIG. 14.

The devices 603E37 and 603E39 are the parasitic diodes between drain and bulk of PMOS 603E30 and 603E31 respectively. The devices 603E36 and 603E38 are parasitic diodes between substrate and bulk of PMOS 603E30 and 603E31 respectively.

FIG. 15 is similar to FIG. 14, and it outputs signal 612 as logic low when there is any fault condition happens and logic high for a normal case. The difference between FIG. 15 and FIG. 14 is that FIG. 15 doesn't take signal 603D, which indicating VDD 601 out of range.

The circuits in both FIG. 14 and FIG. 15 are to output the lowest voltage among the signals 601, 610 and 611 as control signal 612 and 613 when there is any wiring fault. Therefore these control signals 612 and 613 shows the lowest voltage in the system, which can turn off the block 602 and 605 in FIG. 8 as needed.

Alternate Ways Invention can be Practiced

The following shows one alternative way of implementation. In this figure, there is no resistor 311, and the source of 310 is directly connected to ground. The drain of 308 and 310 are connected together. Therefore the compensation current is directly injected into 310.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

The invention claimed is:

1. An application specific integrated circuit (ASIC) comprising:
- an internal circuit coupled between a power line and ground;
- an output buffer 604 coupled to the internal circuit; wherein the output buffer provides an output signal on an output;
- a fault detection circuit 603 coupled between the power line and ground;
- a first fault protection block 602 configured to receive a first control signal from the fault detection circuit, wherein a first switch is coupled to the power line and the internal circuit; wherein the first fault protection block prevents current from flowing between the power line and ground when a first fault condition is detected; wherein the first fault condition comprises a reverse connection between the power line and ground; and a second fault protection block 605 configured to receive a second control signal from the fault detection circuit, wherein the second fault protection block prevents current from flowing between the power line and the output line when a second fault condition is detected; wherein the second fault condition comprises a reverse connection between the power line and the output or between the output and ground.

2. The ASIC of claim 1, wherein the fault detection circuit comprises a fault detection block and the second fault protection block comprises an output protection block.

3. The ASIC of claim 2, wherein the fault detection block comprises an over voltage detection block for detecting an over voltage on the high voltage line and a connection check block for receiving signals from the over voltage detection block and providing control signals to the output protection block.

4. The ASIC of claim 2, wherein the output protection block includes three terminals, one terminal is coupled to a control signal, one terminal is coupled to an internal signal, and one terminal is coupled to the output.

5. The ASIC of claim 3, wherein the first fault protection block comprises first and second fault protection circuits, where one of the first and second fault protection circuits is coupled between the power line and the over voltage detection block and the other of the first and second fault protection circuits is coupled to the connection check block and the output.

6. The ASIC of claim 4, wherein the output protection block comprises a switch to protect internal signals from out of range voltages that occur on the output.

* * * * *